United States Patent
Francisco

(10) Patent No.: US 9,442,549 B2
(45) Date of Patent: Sep. 13, 2016

(54) LOW POWER PAGING OF CONSUMER ELECTRONICS

(71) Applicant: Comcast Cable Communications, LLC, Philadelphia, PA (US)

(72) Inventor: Mark Francisco, Clarksburg, NJ (US)

(73) Assignee: Comcast Cable Communications, LLC, Philadelphia, PA (US)

(*) Notice: Subject to any disclaimer, the term of this patent is extended or adjusted under 35 U.S.C. 154(b) by 88 days.

(21) Appl. No.: 14/136,727

(22) Filed: Dec. 20, 2013

(65) Prior Publication Data

US 2014/0189383 A1    Jul. 3, 2014

Related U.S. Application Data

(63) Continuation of application No. 13/763,027, filed on Feb. 8, 2013, now Pat. No. 8,631,260, which is a continuation of application No. 12/762,018, filed on Apr. 16, 2010, now Pat. No. 8,392,732.

(51) Int. Cl.
*G06F 1/00* (2006.01)
*G06F 1/32* (2006.01)

(52) U.S. Cl.
CPC ............... *G06F 1/32* (2013.01); *G06F 1/325* (2013.01); *G06F 1/3209* (2013.01); *G06F 1/3234* (2013.01)

(58) Field of Classification Search
CPC .................................................. G06F 1/3203
USPC ................................................. 713/310
See application file for complete search history.

(56) References Cited

U.S. PATENT DOCUMENTS

| | | | |
|---|---|---|---|
| 5,054,052 A | 10/1991 | Nonami | |
| 5,245,346 A * | 9/1993 | Nishimura et al. | 342/42 |
| 5,479,260 A | 12/1995 | Fattinger | |
| 5,530,879 A | 6/1996 | Crump et al. | |
| 5,692,197 A | 11/1997 | Narad et al. | |
| 5,790,946 A * | 8/1998 | Rotzoll | 455/343.1 |
| 6,449,683 B1 | 9/2002 | Silvester | |
| 6,493,780 B2 | 12/2002 | Hsu | |
| 6,522,668 B1 * | 2/2003 | Singleton et al. | 370/480 |
| 6,567,921 B1 | 5/2003 | Guziak | |
| 6,593,845 B1 | 7/2003 | Friedman et al. | |
| 6,760,578 B2 | 7/2004 | Rotzoll | |
| 7,050,775 B2 | 5/2006 | Mayor et al. | |
| 7,142,838 B2 * | 11/2006 | Rotzoll | 455/343.2 |
| 7,149,243 B2 | 12/2006 | Porat et al. | |
| 7,389,528 B1 | 6/2008 | Beser | |
| 7,512,981 B2 | 3/2009 | Pearson | |
| 7,650,135 B2 | 1/2010 | Twitchell | |
| 7,912,442 B2 * | 3/2011 | Rotzoll | 455/343.2 |

(Continued)

OTHER PUBLICATIONS

U.S. Appl. No. 13/668,954, filed Nov. 5, 2012, Remote Wake Using Signal Characteristics.

(Continued)

*Primary Examiner* — Suresh Suryawanshi
(74) *Attorney, Agent, or Firm* — Banner & Witcoff, Ltd.

(57) ABSTRACT

Systems, apparatuses, and methods are configured to monitor signals received via a transmission medium by a paging monitor to detect an activity trigger. Systems, apparatuses, and methods are further configured to, in response to detecting the activity trigger, cause, by the paging monitor, a main receiver to transition from an energy conservation mode to an active mode to monitor the transmission medium for data traffic.

20 Claims, 9 Drawing Sheets

(56) References Cited

U.S. PATENT DOCUMENTS

| | | | |
|---|---|---|---|
| 7,912,443 B2* | 3/2011 | Rotzoll | 455/343.2 |
| 7,915,997 B2* | 3/2011 | King et al. | 340/3.21 |
| 7,929,059 B2 | 4/2011 | Watson et al. | |
| 7,944,340 B1* | 5/2011 | Ghabra et al. | 340/12.22 |
| 7,986,933 B2 | 7/2011 | Dehner et al. | |
| 7,995,508 B2 | 8/2011 | Ruy et al. | |
| 8,019,316 B2 | 9/2011 | Huston et al. | |
| 8,108,704 B2* | 1/2012 | Chen et al. | 713/323 |
| 8,761,065 B2* | 6/2014 | Stephens et al. | 370/311 |
| 2001/0041551 A1 | 11/2001 | Rotzoll | |
| 2002/0152473 A1 | 10/2002 | Unger | |
| 2003/0119568 A1 | 6/2003 | Menard | |
| 2006/0198335 A1* | 9/2006 | Reunamaki et al. | 370/328 |
| 2010/0003927 A1 | 1/2010 | Chou et al. | |
| 2010/0141400 A1* | 6/2010 | Radulescu et al. | 340/10.33 |
| 2010/0259678 A1 | 10/2010 | Vantalon et al. | |
| 2010/0330932 A1 | 12/2010 | Cowley et al. | |
| 2011/0084815 A1 | 4/2011 | Fitzek | |
| 2011/0212698 A1 | 9/2011 | Le Guillou et al. | |
| 2011/0258463 A1 | 10/2011 | Francisco | |
| 2012/0069893 A1 | 3/2012 | Shirakata et al. | |
| 2012/0190390 A1 | 7/2012 | Reunamaki et al. | |
| 2014/0094132 A1 | 4/2014 | Ravindran et al. | |
| 2015/0116127 A1* | 4/2015 | Lynch et al. | 340/870.02 |

OTHER PUBLICATIONS

U.S. Appl. No. 12/762,018, filed Apr. 16, 2010, Systems, apparatuses, and methods to monitor signals received by a paging monitor to detect an activity trigger.

U.S. Appl. No. 12/763,027, filed Feb. 8, 2013, Low power paging of consumer electronics.

TIA/EAI IS-54, "Cellular System Dual-Mode Mobile Station-Base Station Compatibility Standard," Telecommunications Industry Association, Apr. 1992.

K.J. Christensen et al., "The next frontier for communications networks: power management," Computer Communications 27 (2004), p. 1758-1770.

ANSI/SCTE 54 2009, "Digital Video Service Multiplex and Transport System Standard for Cable Television," © Society of Cable Telecommunications Engineers 2009, p. 1-18.

* cited by examiner

LOW POWER PAGING OF CONSUMER ELECTRONICS

CROSS REFERENCE TO RELATED APPLICATION

This application is a continuation of prior U.S. Ser. No. 13/763,027 (now U.S. Pat. No. 8,631,260), filed on Feb. 8, 2013, and entitled "Low Power Paging of Consumer Electronics", which is a continuation of prior U.S. Ser. No. 12/762,018 (now U.S. Pat. No. 8,392,732), filed on Apr. 16, 2010, and entitled "Low Power Paging of Consumer Electronics", the contents of which are hereby incorporated by reference.

BACKGROUND

Energy conservation has become a primary concern, and there will always be a need to improve energy efficiency. One problem area where improvement is needed is in home electronics. Today, many devices unnecessarily consume energy by drawing electric current from a wall socket even when not in use. Conventional solutions to this problem include turning off and/or unplugging each and every device in the home, but that is time consuming, inefficient, and often overlooked. Another conventional solution is to plug multiple devices into a power strip and turn off the strip when not in use. Some smart power strips draw less current (and are therefore likely to be in a powered down state), and can turn themselves off. But turning off an entire power strip is not always desirable, either, since not all devices are in the same powered down state.

Accordingly, there remains the ever-present need for improved energy efficiency.

SUMMARY

This summary is provided to introduce a selection of concepts in a simplified form that are further described below in the Detailed Description. This summary is not intended to identify key features or essential features.

Some features described herein improve energy efficiency by powering down devices, and using a low power wireless paging signal to reactivate those devices when needed. In at least some embodiments, systems, apparatuses, and methods are configured to monitor signals received via a transmission medium by a paging monitor to detect an activity trigger. Systems, apparatuses, and methods are further configured to, in response to detecting an activity trigger, for example, cause, by the paging monitor, a main receiver to transition from an energy conservation mode to an active mode to monitor the transmission medium for data traffic.

BRIEF DESCRIPTION OF THE DRAWINGS

Some embodiments of the present disclosure are illustrated by way of example, and not by way of limitation, in the figures of the accompanying drawings and in which like reference numerals refer to similar elements.

DETAILED DESCRIPTION

Figure 1:
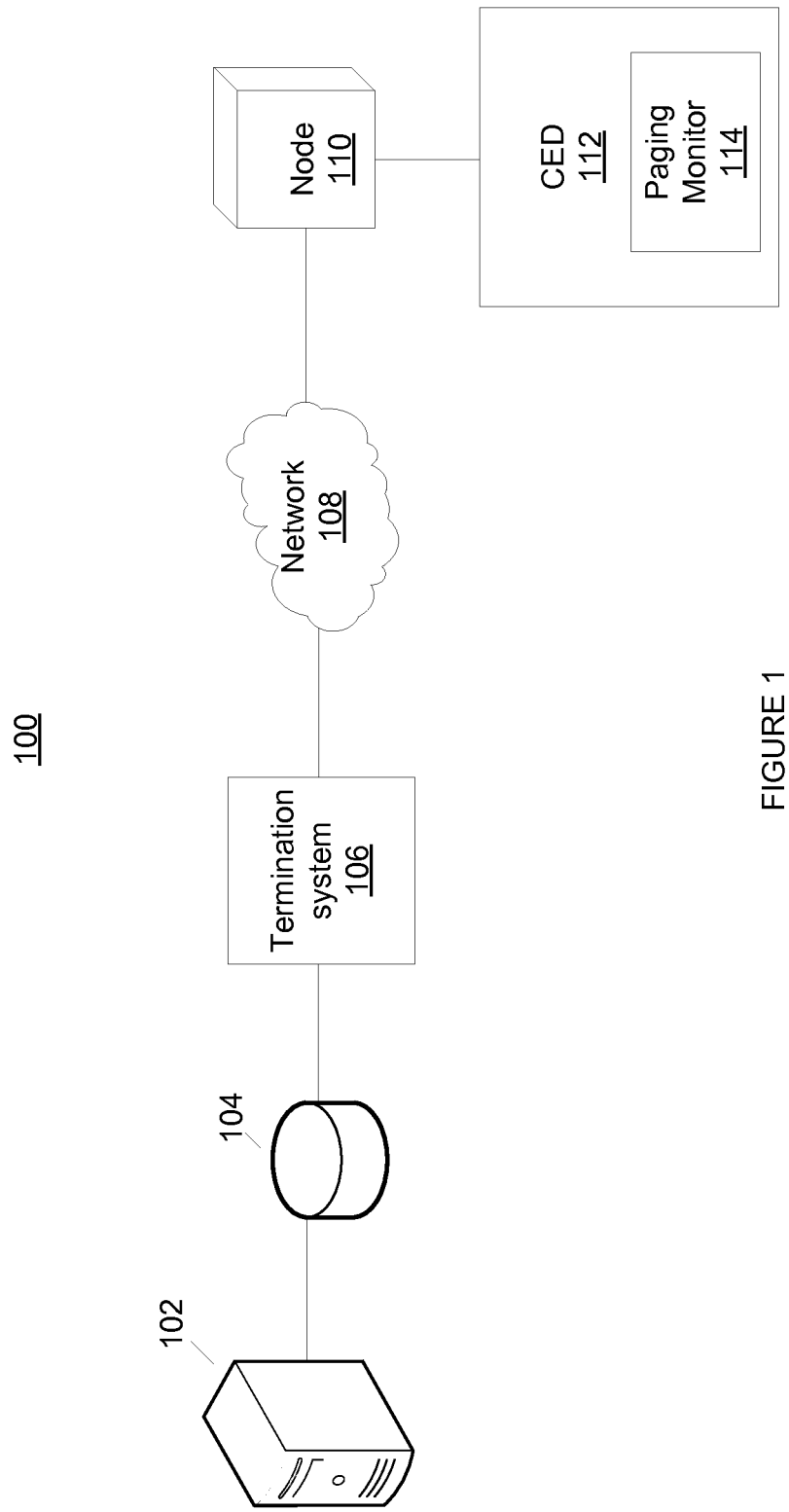
FIGS. 1-2 are block diagrams showing an example of systems for communicating activity triggers.

FIG. 1 is a block diagram showing a system 100 for communicating activity triggers according to at least some embodiments. The following describes system 100 with respect to a network, for example, a wireless, fiber, cable, or a combination network. The concepts described herein are applicable to other types of networks. The system 100 may be implemented having wired and/or wireless links between components. Although only a single instance of each component is depicted in FIG. 1, as well as in the other figures, multiple instances of each component (e.g., multiple CEDs) may be used. The depicted components may be integrated with one another or may be separated into further subcomponents.

In an example embodiment, the system 100 may include an application server 102, a router 104, a termination system 106, a network 108, a node 110, and a consumer electronics device (CED) 112. The CED 112 can be a Set Top Box (STB), digital video recorder (DVR), cable modem, a mobile phone, a display device, or other device that can receive content data from the application server 102 via the network 108 and output the content data in a form that is presentable to the user or usable by another device (e.g., a television, a computer, a local network in the subscriber premises). The network 108 may be, for example, a wide area or local area network.

Content can be any desired form of electronic data. Content can include video images, audio sounds and other forms of information that can be encoded into data for communication to a consumer electronics device and then decoded so as to be displayed or otherwise conveyed in human-understandable form. Content can include audio and video communications associated with television programming. Content may also include other forms of data, such as software updates and security data.

The application server 102 may communicate content data to the router 104 for forwarding to node 110 via the termination system 106 and the network 108. The node 110 may be, for example, located in an area (e.g., neighborhood) that provides a branch into a user premises (e.g., home, business) where the CED 112 is located. The node 110 may be any part of an information distribution network, such as an optical coaxial cable or wireless interface node. Alternatively, CED 112 may be connected directly to server 102 via the network 108.

To reduce power usage by the CED 112, the CED 112 may be configured to enter an energy conservation (EC) mode at appropriate times. The EC mode may be, for example, a low power consumption sleep cycle or a standby mode. In the EC mode, the CED 112 may turn off some or all of its circuitry and/or other components to reduce power consumption. The circuitry, for instance, may be used to process content received from the application server 102. When in the EC mode, a paging monitor 114 may remain powered on to monitor for network initiated activity triggers and user requests.

For example, if the CED 112 is a television set-top box, there may be times when the set-top box can deactivate certain components to save power. One example may be a time-of-day display on the front of many set-top boxes. That time of day display might not be needed, for example, during certain times of the day (e.g., during week day work hours when no one is home, or between midnight and 7 a.m., when everyone is asleep), so during those times, the set-top box might deactivate the display. Another example might be circuitry controlling a hard disk drive in the set-top box—some hard disks may keep disks spinning to reduce access time, but that might not be needed if there are times when disk access is determined to be less likely.

When the CED 112 is in the EC mode, the application server 102 may determine when the CED 112 should be "awoken," and may transmit activity triggers to waken the CED 112 to perform an operation. The application server 102 may, for example, wake up the CED 112 to initiate a software update, inform the CED 112 of an incoming message or call, reply to a maintenance poll, or other network-initiated events.

In response to an activity trigger, the CED 112 may transition to an active mode from the EC mode. In the active mode, the CED 112 may have turn back on some or all of its circuitry to perform the requested function.

The activity trigger may be a lower power signal received by the paging monitor 114. The activity trigger may be a message included in a stream of digital data, or may be an analog signal that has been combined into the radio frequency (RF) spectrum delivered to an RF input of the CED 112. For example, the activity trigger may be a single bit message embedded in otherwise normal downstream traffic, or it can be modulated completely separately from that used to carry typical downstream data. A trigger that is only one bit can be modulated in a variety of alternative ways that could be inefficient for carrying larger quantities of data. The activity trigger may be transmitted with a lower power or simpler modulation method than normal high-speed traffic. The activity trigger may be a simple signal combined into a RF path and may have a signal level lower than normal data carriers (e.g., 10-20 dB lower). Also, if the activity trigger is a message within the normal data stream, the activity trigger may not have any different power characteristics than other downstream signaling. The paging monitor 114 may be a receiver limited to monitoring for activity triggers in data traffic received at the CED 112, but does not otherwise process the data traffic. The paging monitor 114 may wake up other circuitry of the CED 112 upon receipt of the activity trigger.

The application server 102 may synchronously or asynchronously provide the activity triggers to the CED 112. For synchronous activity triggers, the application server 102 and the CED 112 may have synchronized clocks providing a time reference where activity triggers are only communicated during certain periods of time, denoted as paging periods, so that the CED 112 does not need to constantly be checking for receipt of a trigger (e.g., the trigger detection/reception circuitry itself may consume power). Synchronous activity triggers beneficially provide power management permitting the CED 112 to enter the EC mode between paging periods as the CED 112 is not expected to process any requests other than a user request (e.g., a keypress by a user) or an internal scheduled activity, such as recording content. The paging period may occur at consistent periodic time intervals (e.g., during a first second of a repeating ten second interval) or at varying time intervals (e.g., the application server 102 may inform the CED 112 when the varying time intervals occurs).

For asynchronous communication, the application server 102 may communicate an activity trigger at any time, and the CED 112 may continuously monitor for activity triggers. This may result in the CED 112 expending more energy to constantly monitor for triggers, but it allows for more immediate waking of the CED 112. Also, the CED 112 may be a passive device where the activity trigger contains sufficient energy to waken the paging monitor 114 upon receipt. Asynchronous communication of activity triggers may be used when the paging monitor 114 consumes sufficiently low power to operate at all times or is a passive device. Asynchronous communication also reduces delay when contacting the CED 112. Rather than having to wait for a paging period as in synchronous communication, the application server 102 may transmit an activity trigger at any desired time.

Figure 2:
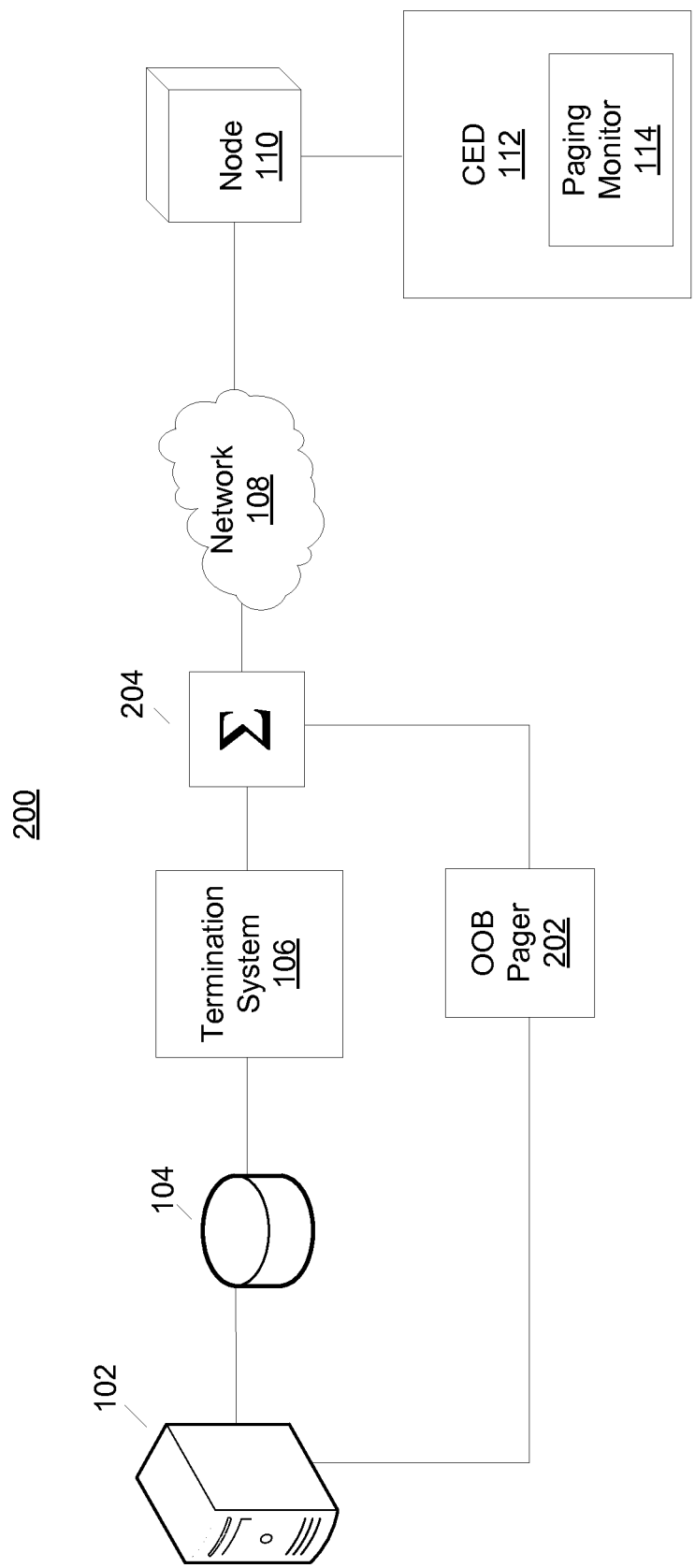

FIG. 2 illustrates a system 200 for asynchronously communicating activity triggers according to at least some embodiments. In addition to the components described in the system 100, the system 200 may include an out of band (OOB) pager 202 and a combiner 204. OOB may refer to the activity trigger being orthogonal to other data traffic of the application server 102. Examples of orthogonal communication may include sending the activity trigger on a different frequency (e.g., lower or higher) from the other data traffic, or in any other way that does not interfere with the data. The combiner 204 may receive and multiplex the activity trigger signal with the other data traffic signals from the application server 102 for transport via the network 108. For out-of-band signals, the activity trigger signaling may be sent as a separate signal and combined at RF for transport through the network 108. The OOB pager 202 also may be integrated into the application server 102, as described below.

Figure 3:
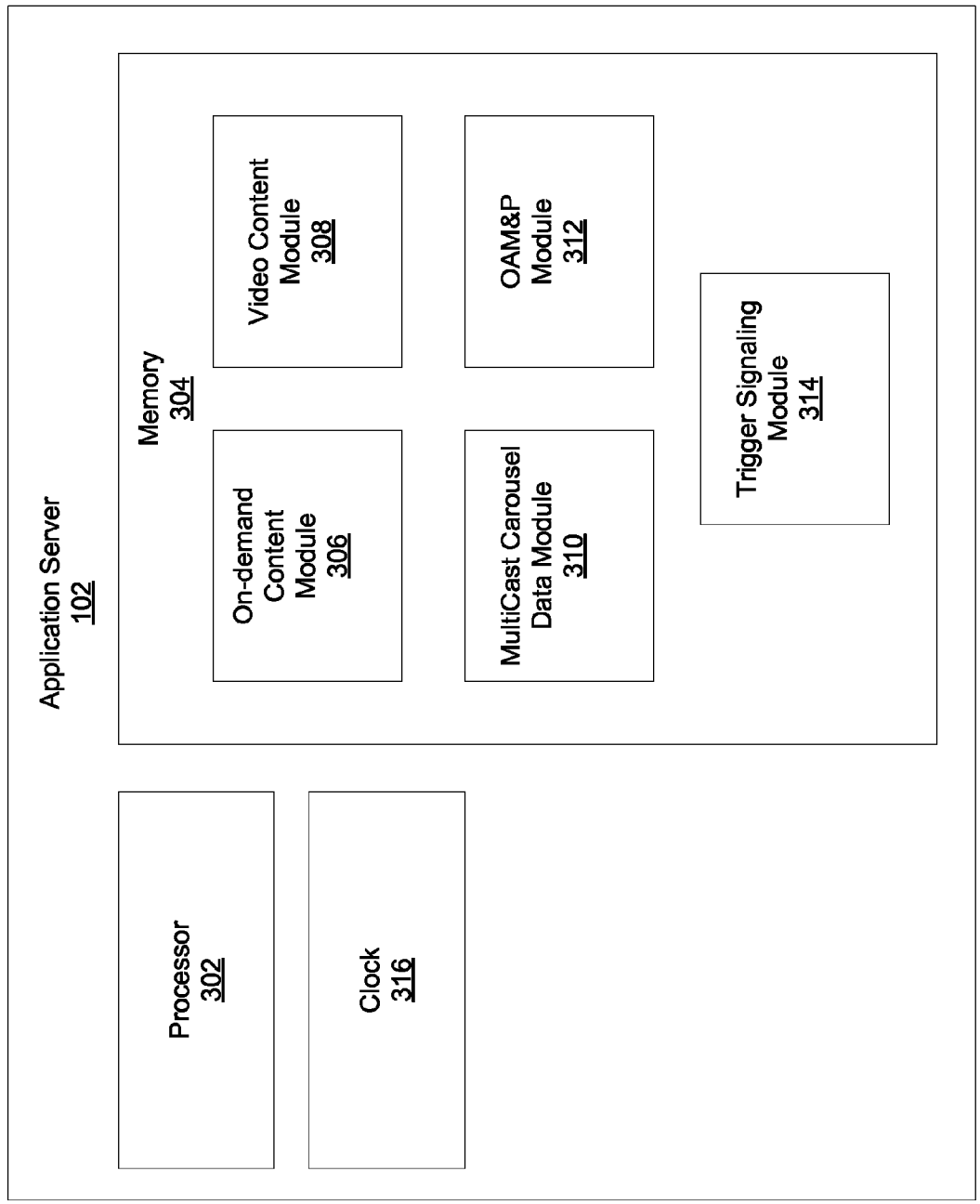
FIG. 3 illustrates an example application server.

FIG. 3 illustrates the application server 102 according to at least some embodiments. The application server 102 may include a processor 302 and a memory 304. The memory 304 may be one or more tangible and physical media that store an on-demand content module 306, a video content module 308, a multicast carousel data module 310, an Operation, Administration, Maintenance and Provisioning (OAM&P) module 312, a trigger signaling module 314, and other computer executable instructions. The memory 304 may be, for example, a hard disk, a floppy disk, FLASH memory, an optical disk, any combination thereof, and/or any device configurable to store data. The modules 306, 308, 310, 312, and 314 may contain computer executable instructions that, when executed, cause the processor 302 to perform the functions of the application server 102 described herein. The modules 306, 308, 310, 312, and 314 also may be partially or fully implemented as hardware.

The on-demand content module 306 may cause the application server 102 to communicate on-demand content data in response to requests from the CED 112. The video content module 308 may cause the application server 102 to broadcast content data to the CED 112 according to a programming schedule. The multicast carousel data module 310 may cause the application server 102 to communicate security data and updates, software, firmware, and program guide data to the CED 112. The OAM&P module 312 may cause the application server 102 to communicate monitoring and maintenance data to the CED 112. The modules 306, 308, 310, and/or 312 also may instruct the trigger signaling module 314 to communicate an activity trigger to cause the CED 112 to transition to the active mode to receive their respective types of data (e.g., content, software updates, etc.).

The trigger signaling module 314 may be a low-power one-way communication subsystem that transmits activity triggers to the CED 112 via the network 108. The trigger signaling module 314 may include the OOB pager 202 and/or combiner 204, or the OOB pager 202 may be external as shown in FIG. 2. The trigger signaling module 314 may use MPEG signaling in accordance with American National Standard, ANSI/SCTE 54 2009, "Digital Video Service Multiplex and Transport System Standard for Cable Television," or an FM paging channel, from TIA/EAI IS-54, "Cellular System Dual-Mode Mobile Station-Base Station Compatibility Standard," Telecommunications Industry Association, April 1992, as the activity trigger.

The activity trigger may include a device identifier to address at least one CED 112 and may include an instruction to cause the least one CED 112 to perform an operation. For example, the device identifier may be a bit sequence in an MPEG packet addressed to a subset of all CEDs 112 that instructs the addressed CEDs 112 to transition from the EC mode to the active mode to receive a firmware update from the multicast carousel data module 310. In another example, the activity trigger may be an analog signal communicated in a predetermined frequency band to address at least one CED 112. Also, the activity trigger may be a sequence of digital bits communicated in a predetermined frequency band that represent an address of a CED 112 and/or an instruction to perform an operation.

The trigger signaling module 314 may communicate an activity trigger synchronously or asynchronously. When asynchronous, the trigger signaling module 314 may instruct the OOB pager 202 to send the activity trigger at any desired time. When synchronous, the trigger signaling module 314 may identify the next paging period using clock 316 and communicate the activity trigger then. The trigger signaling module 314 may include a queue or other storage mechanism to store multiple activity triggers for transmission during the next paging period. The trigger signaling module 314 may thus provide activity triggers that can be received by low-power circuitry at the CED 112, contain device addressability, and coexist with other uses of the network 108.

Figure 4:
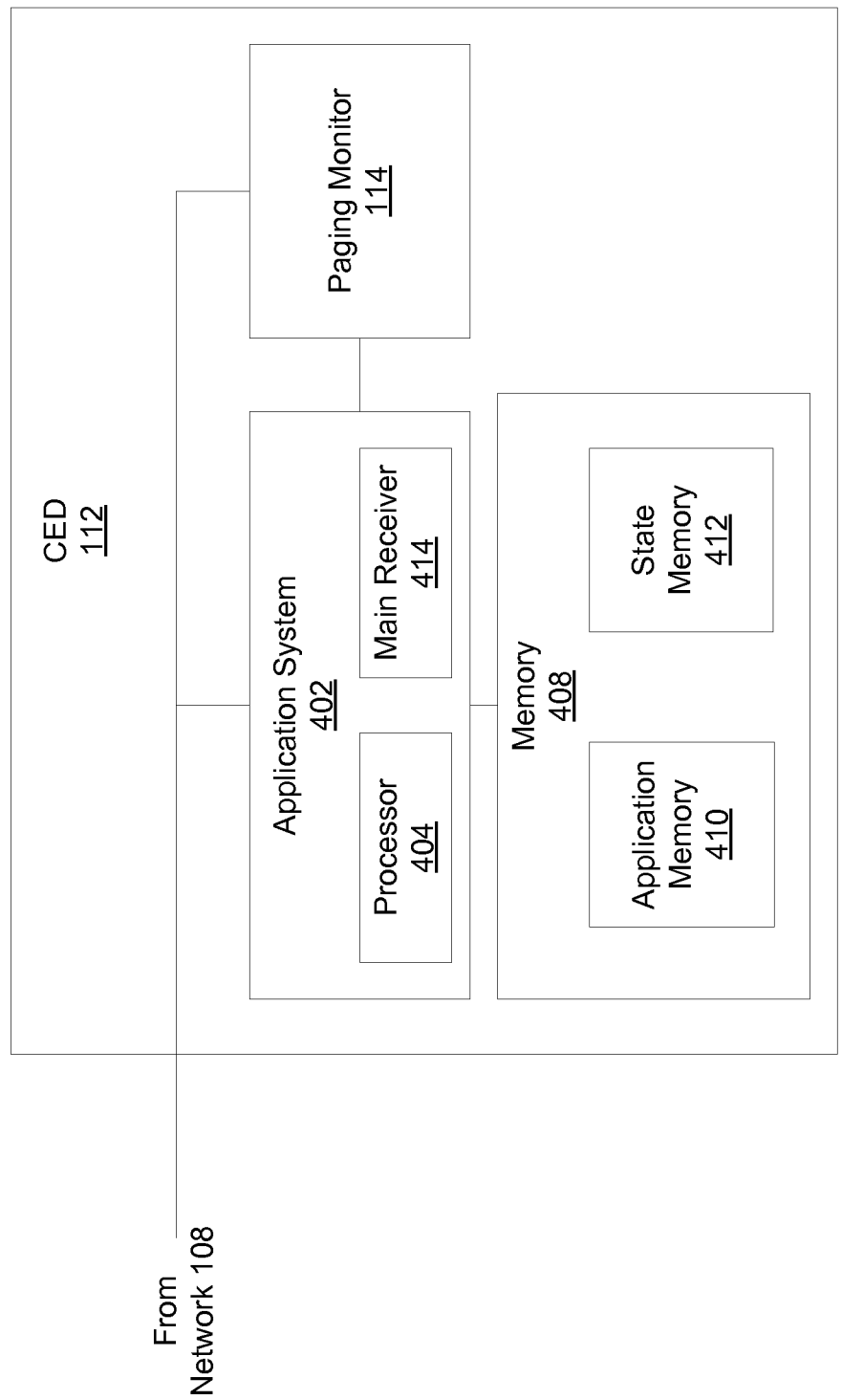
FIG. 4 illustrates an example consumer electronics device.

FIG. 4 illustrates the CED 112 according to at least some embodiments. The CED 112 may include an application system 402, a paging monitor 114, and memory 408. The application system 402 may be any hardware and/or software that consumes electricity when operating, and hence power savings can be achieved by turning it off and/or reducing its capabilities in the EC mode during periods when not being used. For example, CED 112 may save power by turning off upstream RF transmission capabilities, Wi-Fi transceivers, display screens, LEDs, hard disk drives, slowing a clock down, entering a freeze mode, stopping updating a panel display, etc.

In an example embodiment, the application system 402 may include a processor 404 and a main receiver 414. The main receiver 414 may process data traffic received at the CED 112 when operating in the active mode, but not when in the EC mode because it is turned off. If the CED 112 is a set top box, for example, the main receiver 414 may tune to a channel when in the active mode to process video data traffic received by the set top box via the network 108.

The memory 408 may be one or more tangible and physical media that store an application memory 410 and a state memory 412 and other computer executable instructions. The memory 408 may be, for example, a hard disk, a floppy disk, FLASH memory, an optical disk, any combination thereof, and/or any device configurable to store data. The processor 404 may execute the computer executable instructions stored in the memory 408 to cause the processor 404 to perform the functions of the CED 112 described herein. The application memory 410 may store data of the application system 402, and the state memory 412 may store a state of the application system 402 before entering the EC mode to reduce the amount of time required by the application system 402 to transition to the active mode from the EC mode. For example, a CED 112 that is a set top box or DOCSIS cable modem may store information regarding frequencies of downstream and upstream carriers being used, avoiding the need for re-registering and/or re-ranging when the CED 112 comes out of EC mode. Similarly, a CED 112 that is a Wi-Fi device could store a Service Set Identifier (SSID) and channel to use, as well as a storing security/cryptographic key information and/or clock/sync information for immediate re-use when coming out of EC mode.

The wake-up function can be triggered by, for example, a key click or a mouse movement related to the CED 112. Wake-up could also be triggered by a network device, for example, instructing the CED 112 to prepare to receive new software. When the CED 112 wakes up from EC mode, the source of the trigger along with the stored state information provides context for the behavior of the CED 112. If, for example, a network server is pushing a software update to the CED 112, functions used for local interaction such as display updates and Wi-Fi radio communications may remain in an energy conservation mode. If, however, the wake-up is triggered by an action of the local user, the CED 112 may wake up in a fully operational state.

The paging monitor 114 may be a dedicated receiver that monitors for activity triggers directed to the CED 112 within data traffic received via the network 108. The paging monitor 114 and the main receiver 414 may be coupled to the same transmission medium to receive the same signals from the network 108. For example, both the paging monitor 114 and the main receiver 414 may be coupled to the same antenna or coaxial cable that provides signals from the network 108 to the CED 112. The paging monitor 114 may be limited to only being capable of identifying activity triggers in the signals received from the network 108, whereas the main receiver 414 may be configured to process digital data traffic in the signals. For instance, the paging monitor 114 may be an analog circuit that monitors for a particular frequency or code sequence in the received signals. The paging monitor 114 also may be a digital circuit that processes the received signals (e.g., packets) to identify an activity trigger addressed to the CED 112. The paging monitor 114 may be configured to consume less electricity than the application system 402, thereby reducing overall power consumption by the CED 112 by permitting the application system 402 to enter the EC mode while the paging monitor 114 monitors for activity triggers. The main receiver 414, as well as the application system 402, may be turned off in the EC mode. The paging monitor 114 may waken the application system 402 from the EC mode in response to identifying an activity trigger directed to the CED 112.

Figure 5:
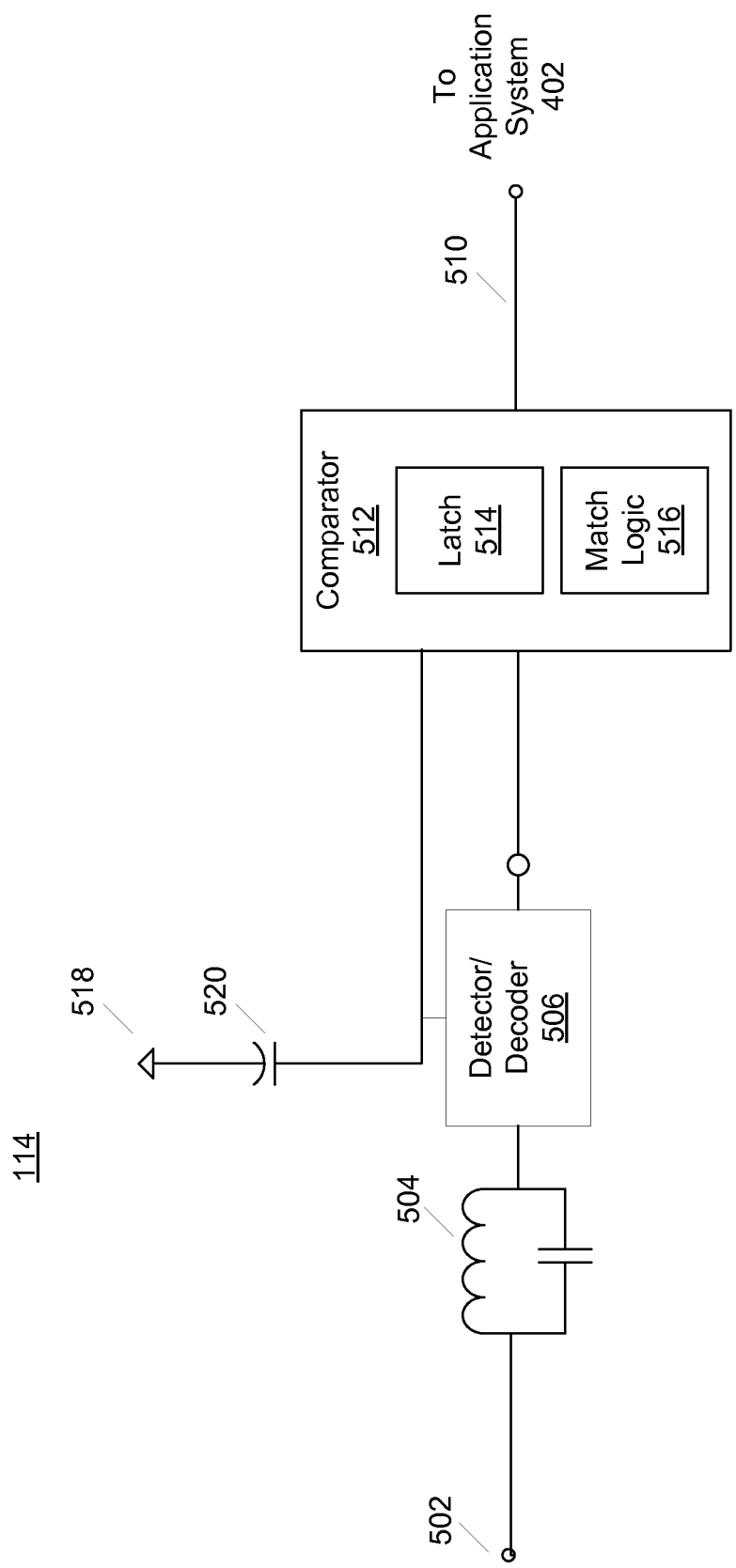
FIG. 5 illustrates an example paging monitor.

FIG. 5 illustrates the paging monitor 114 according to at least some embodiments. The paging monitor 114 may be an analog circuit that includes an input 502, a tuned circuit 504, a detector/decoder 506, and an output 510 that is provided to the application system 402. The paging monitor 114 also may be coupled to a power supply 518 that turns off when a capacitor 520 or other energy storage element is charged.

The input 502 to the tuned circuit 504 may be coupled to a transmission medium from the node 110 or may otherwise receive signals from the network 108. The transmission medium may be wired (e.g., a coaxial cable) or wireless. The received signals, including the activity triggers, may be in the form of light or electromagnetic energy, other suitable transmission forms, and/or any combination thereof.

The tuned circuit 504 may operate as a filter to pass only certain frequencies. The detector/decoder 506 may act on activity triggers having certain characteristics. For example, the detector/decoder 506 may be a crystal detector or other device that listens for activity triggers directed to the CED 112 or a group to which the CED 112 belongs. The tuned circuit 504 in conjunction with the detector/decoder 506 may discriminate between received signals based on frequency, code sequence, time interval, modulation scheme, encryption scheme, other communication techniques, and/or any combination thereof.

FIG. 5 illustrates the tuned circuit 504 comprising an inductor in parallel with a capacitor. The tuned circuit 504 may operate as a bandpass filter that passes an analog signal occurring within a predetermined frequency band. If the data traffic is within the frequency band, the tuned circuit 504 may pass the received signal to the detector/decoder 506. Otherwise, the tuned circuit 504 may output a low voltage to the detector/decoder 506. Other implementations of the tuned circuit 504 may be used.

The detector/decoder 506 may output a high or a low voltage signal based on the signal output from the tuned circuit 504. The detector/decoder 506 may identify a signal output by the tuned circuit 504 as an activity trigger if it has sufficient voltage within the predetermined frequency band. The detector/decoder 506 may be a transistor coupled to receive the output of the tuned circuit 504. If the signal output by the tuned circuit 504 has sufficient voltage, the transistor may turn on causing the detector/decoder 506 to output a low signal to the comparator 512. If the signal output by the tuned circuit 504 is a low voltage, the transistor may turn off causing the detector/decoder 506 to output a high signal to the comparator 512.

The comparator 512 may compare a sequence of outputs from the detector/decoder 506 against a vocabulary stored by match logic 516. The vocabulary may include one or more bit sequences, where match logic 516 includes gates or other logic representing the bit sequences. The bit sequences may represent an address of the CED 112 so that the application server 102 may send activity triggers to waken only the CEDs 112 of interest, and letting the other CEDs 112 remain in the EC mode. For example, the vocabulary may include a first bit sequence that represents an activity trigger common to all of the CEDs 112 so that the application server 102 may simultaneously waken all CEDs 112, and a second bit sequence representing a subset of the CEDs 112 (e.g., by manufacturer, by group).

The bit sequence also may be an instruction the application server 102 is requesting that the CED 112 to perform. For example, the activity trigger may include a bit sequence after the address to instruct the CED 112 to perform an operation. For instance, the activity trigger may include a sequence of bits to identify a time period and channel to instruct the CED 112 to record content on the channel during the identified time period. The vocabulary of the match logic 516 may be modified by updates and/or may be hardwired.

The latch 514 may store a sequence of outputs from the detector/decoder 506 for comparison with the one or more bit sequences of the vocabulary. The comparator 512 may output a high voltage to cause the application system 402 to transition to the active mode when the sequence stored in the latch 514 matches at least one bit sequence in the vocabulary. Otherwise, the paging monitor 114 may output a low voltage when there is no match.

The paging monitor 114 also may be implemented digitally. In such an embodiment, the paging monitor 114 may include a processor and a memory storing computer readable instruction that, when executed, cause the processor to perform the operations of the paging monitor 114 described herein. For example, the paging monitor 114 may monitor for data traffic that include MPEG packets to identify one or more MPEG packets containing instructions addressed to the CED 112. For example, the activity trigger signal could be an MPEG packet having a unique packet identifier (PID). The activity trigger also may be included in a header section of a super frame of MPEG information sent at regular intervals for synchronous mode or included anywhere within the stream for asynchronous mode. The paging monitor 114 may process the MPEG packets to cause the application system 402 to transition to the active mode to perform the instructions.

Upon detection of an activity trigger, the paging monitor 114 may cause the application system 402 to transition to the active mode and/or perform the requested operation. The paging monitor 114 may deactivate when the application system 402 is in the EC mode, or the paging monitor 114 may always remain activated. Upon entering the active mode, the application system 402 may retrieve data from state memory 412 to obtain its previous state before entering the EC mode thereby permitting the application system 402 to more quickly resume operation in response to the activity trigger. The time required by the application system 402 to transition of the active mode after receipt of the activity trigger may be referred to as the stabilization time.

Once the operation has been completed, the application system 402 may transition back to the EC mode upon identification of a termination event. The termination event may indicate that the CED 112 no longer requires resources of the application server 102 and/or that the user is no longer using the CED 112. Termination events may include, for example, powering down of the CED 112, termination of a computer program presenting received content to the user, lack of user interaction for a predetermined amount of time, reaching a program boundary (i.e., end of a program), or a session timeout.

Upon identifying a termination event, the application system 402 may store its current state information in the state memory 412. The data stored in state memory 412 may correspond to the state of the CED 112 before entering the EC mode. The application system 402 may optionally communicate a release request to application server 102 to free up any resources allocated to the CED 112 when a termination event is identified.

Before entering the EC mode, the application system 402 may communicate an EC mode signal to activate the paging monitor 114 to begin monitoring for activity triggers. For example, the EC mode signal may cause power to be applied to the circuitry of the paging monitor 114 during the paging periods. In another example, the EC mode signal may cause the paging monitor 114 to provide power to the circuitry of the paging monitor 114 to monitor for asynchronous activity triggers. After communicating the EC mode signal, the application system 402 may cause itself and the main receiver 414 to enter the EC mode.

Figure 6:
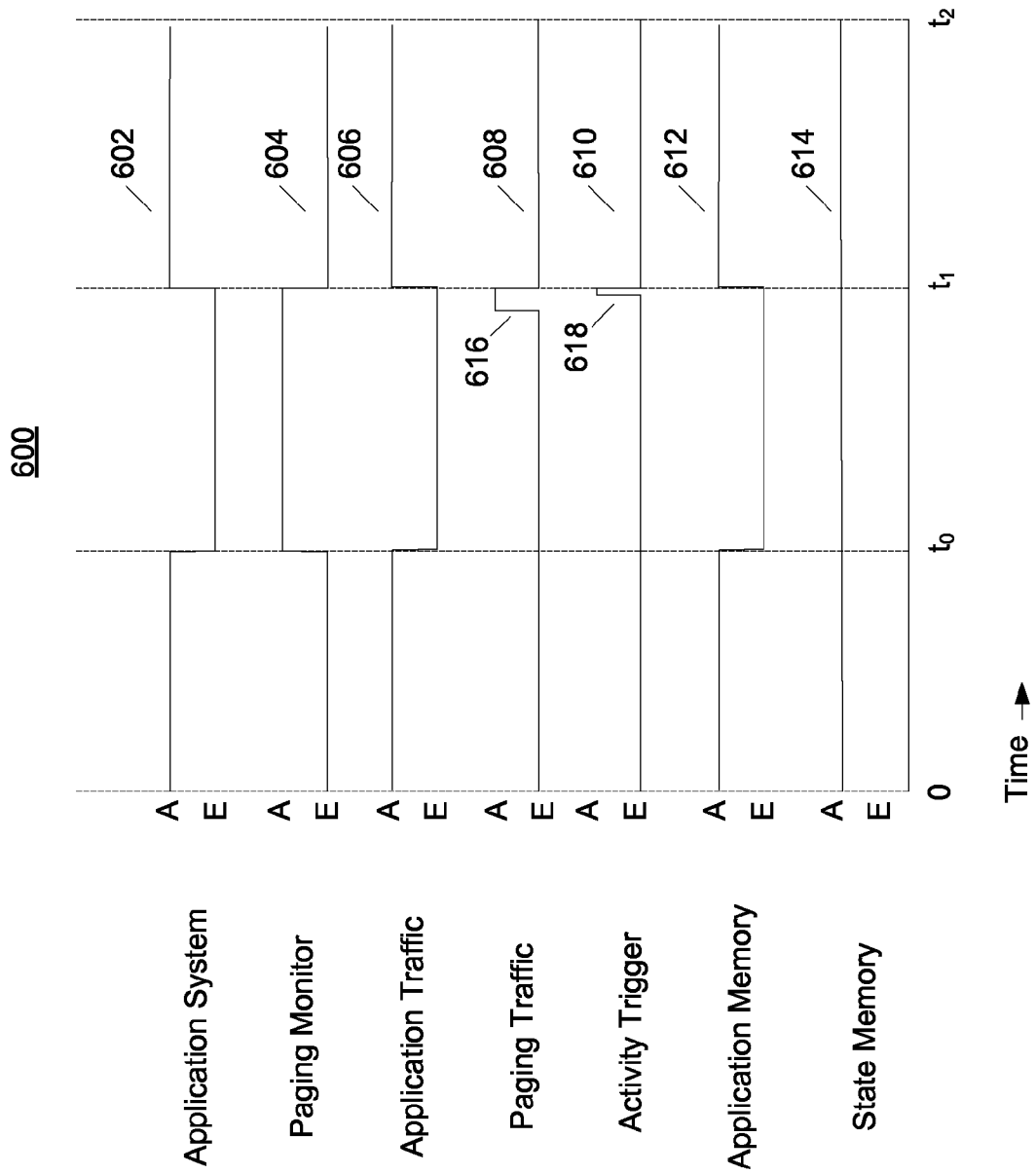
FIG. 6 illustrates an example timing diagram.

FIG. 6 illustrates a timing diagram according to at least some embodiments. The timing diagram 600 depicts the activity of various components of the CED 112 along the time axis proceeding through time periods 0, $t_0$, $t_1$, and $t_2$. Even numbered lines 602-614 represent the activity of various components in the CED 112, with A representing the active mode and E representing the EC mode for the application system 402.

From time 0 to time period $t_0$, the application system 402 may be in the active mode processing application data traffic, and the paging monitor 114 may ignored or turned off. The application memory 410 and the state memory 412 may be actively used by the application system 402 during this time period.

At time period $t_0$, the application system 402 may identify a termination event and transition to the EC mode. The paging monitor 114 may process incoming data traffic to determine whether an activity trigger directed to the CED 112 has been received. The width of pulse 616 may represent a paging period if activity triggers are synchronous, and alternatively, the application server 102 may use asynchronous transmission and the paging monitor 114 may continuously monitor for activity triggers. The state memory 412 may remain active during this time period to allow retrieval of the state of the application system 402 prior to entering the EC mode. The application memory 410 may be turned off during this time period as it is not being used by the application system 402. In the paging period 616, the paging monitor 114 may identify an activity trigger 618 and, in response, may cause the application system 402 to transition to the active mode. The application system 402 may then transition to the active mode at time period $t_1$ and operate similar to operation during the time period between time 0 and time $t_0$. The foregoing are example embodiments, and the illustrated, and other, systems may transition as desired.

The CED 112 may be implemented as a number of different devices, and the following description provides example signaling diagrams when the CED 112 is implemented as a set top box, an Internet Protocol Client, a cable modem, and a wireless phone.

Figure 7:
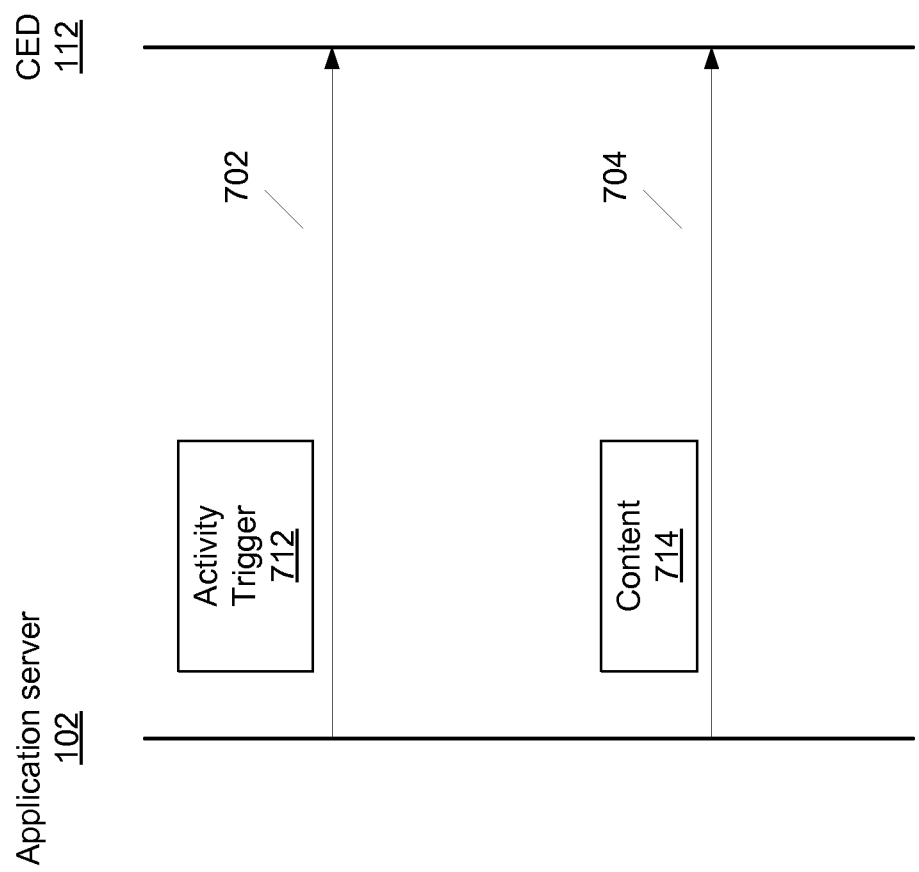
FIG. 7 illustrates an example signaling diagram for providing content.

FIG. 7 illustrates a signaling diagram for providing content to a CED 112 implemented as a set top box. A set-top box may be a two-way device, but often functions as a one-way device, with the majority of processing of the application system 402 being performed in response to user input, such as for viewing programming content or recording of scheduled broadcasts. Rather than remaining powered and fully operational at 100% duty cycle regardless of user activity, the CED 112 may transition to the EC mode (e.g., a power-saving mode) during times when no active viewing is occurring and when there are no scheduled activities, such as, but not limited to, program guide updates, content security renewals, and software maintenance.

At numeral 702, the application server 102 may communicate an activity trigger 712 to the CED 112. The activity trigger 712 can allow network-based entities (i.e., the application server 102), in addition to home-based entities, to transition the CED 112 from the EC mode (e.g., a sleep mode) to the active mode to perform an operation. Example operations for a set top box may include updating security keys, incremental program guide data availability, and polling of maintenance statistics initiated by a provider or technician. In this example, the activity trigger 712 may be addressed to one or more CEDs 112. A single activity trigger, a group activity trigger, and an all activity trigger may each include a unique sequence of bits. For example, the single activity trigger may identify the address of a single CED 112, a group activity trigger may identify the address of two or more CEDs 112 out of a group of CEDs 112, and the all activity trigger may be used to identify a common address used to contact all CEDs 112.

The application server 102 may communicate the activity trigger 712 synchronously or asynchronously. For example, the application server 102 may communicate the "all" activity trigger to cause all CEDs to enter an active mode to receive program guide data scheduled for transmission daily at a certain time period or to receive a security key update scheduled based on key expiration details.

The activity trigger 712 can also include an instruction to instruct the set top box, or any other device, to perform an operation. A record instruction (e.g., Record Channel 705), for example, may include a bit sequence identifying a time period and a channel to instruct the application system 402 of the CED 112 to transition to the active mode to record broadcast content on the identified channel during the identified time period. For example, the instruction may be a sequence of bits to address the CED 112 and then to identify a time and channel of the program. Another example instruction is an update instruction (e.g., Update with Firmware version 27.52), which may include a sequence of bits to address the CED 112 and then to identify a firmware update. The application system 402 can perform the instructed operation and then return to the EC mode upon completion.

FIG. 7 is also applicable to a signaling diagram for providing content to a CED 112 implemented as a modem, such as, for example, a cable modem. A modem can function as a bridge between a provider's plant and an Ethernet-based home broadband network. A modem may be a highly available device supporting telephony, Internet surfing, and monitoring services that can require frequent data transfer. Modems historically have either remained powered on and operating continuously or have contained manual mechanisms to shut part or all of their circuitry off in response to a consumer interest disabling certain functions. Implementing CED 112 as a modem can provide autonomous standby to save energy, reduce unwanted noise transmission on the plant, and prolong the life of the modem through cooler operation, while maintaining high availability of an internet and telephony bridging device. Even though a modem is not actively processing data traffic in the received signals while in the EC mode, the paging monitor 114 is monitoring for activity triggers to wakeup the modem to process data traffic.

With reference to FIG. 7, at numeral 702, the application server 102 may communicate an activity trigger 712 to the CED 112 either synchronously or asynchronously, as described above. The activity trigger 712 may include a bit sequence to address the CED 112 and then to request that the CED 112 perform an operation. For example, the activity trigger 712 may instruct the CED 112 to transition to the active mode to receive data traffic or provide signal strength parameters to the application server 102.

At numeral 704, the CED 112 may receive the content 714 from the application server 102 upon completion of the transition to the active mode. Thus, the CED 112 implemented as a modem can remain in a low power consumption EC mode and retain the ability to listen for activity triggers 712 while keeping the CED 112 responsive to user and network needs.

FIG. 7 may also provide a signaling diagram for providing content to CED 112 implemented as a telephone. For example, the CED 112 may be implemented as a WiFi telephone. A WiFi telephone is expected to maintain high availability and long battery life. Conventional WiFi telephones, however, have considerable power consumption even when in a standby mode. Implementing activity triggers as described herein can allow a WiFi telephone to enter an EC mode when not actively in use to reduce power more effectively as compared with conventional standby modes for WiFi telephones. The paging monitor 114 may be a low-power consumption radio (e.g., FM, pulse code modulation, or radio frequency identification) that listens for activity triggers and the main receiver 414, which includes WiFi circuitry in this example, may be shut off for all but short periods of time during specified regularity. When an activity trigger is addressed to the CED 112, the paging monitor 114 may wake up the WiFi circuits to receive a phone call.

With reference to FIG. 7, at numeral 702, the application server 102 may communicate an activity trigger 712 to the CED 112. The activity trigger 712 may include a sequence of signals containing a device address followed by an instruction. The instruction may, for example, instruct the CED 112 to transition to the active mode to receive an incoming call or a firmware update.

At numeral 704, the CED 112 may receive the content 714 from the application server 102 upon completion of the transition to the active mode. As such, the CED 112 may remain readily available while reducing power consumption for a longer battery life.

Figure 8:
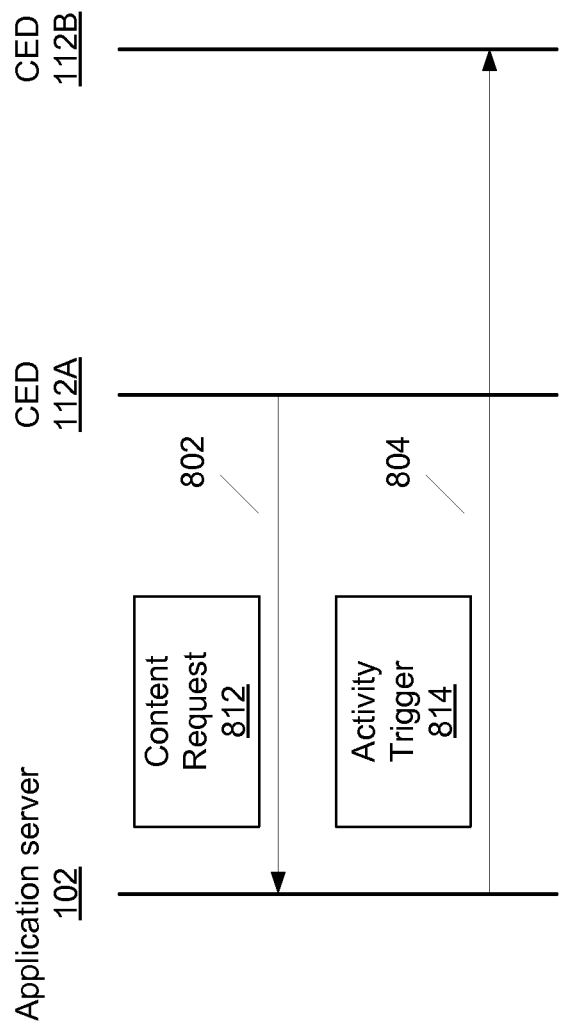
FIG. 8 illustrates an example signaling diagram for a network-based remote control.

FIG. 8 illustrates a signaling diagram for a network-based remote control according to at least some embodiments. The CED 112A can operate as a network-based remote control to initiate an activity trigger to control programming displayed at and/or recorded by CED 112B. The user may, for example, authorize their children to view a particular program and/or may purchase a pay-per-view program as a gift for a friend. In an example embodiment, the CED 112A may be a WiFi capable smartphone and CED 112B may be an IP video receiver. The user of CED 112A may browse a program guide via a web browser and subsequently choose a program for presentation at CED 112B.

At numeral 802, the CED 112A may communicate a content request 812 to the application server 102 in response to the content (e.g., television program) selected by the user. The content request 812 may include a content identifier to identify the selected content and may include a device identifier of CED 112B. The content identifier may also include purchase information for a fee based service (e.g., a pay per view event).

At numeral 804, the application server 102 may communicate an activity trigger 814 to the CED 112B in response to the content request 812. The activity trigger 814 may include an instruction comprising the device identifier and the content identifier to instruct CED 112B to transition to the active mode and to tune to a channel on which the content corresponding to the content identifier is being broadcast. The instruction may also include an authorization code to permit viewing of fee based content in response to the purchase information.

Figure 9:
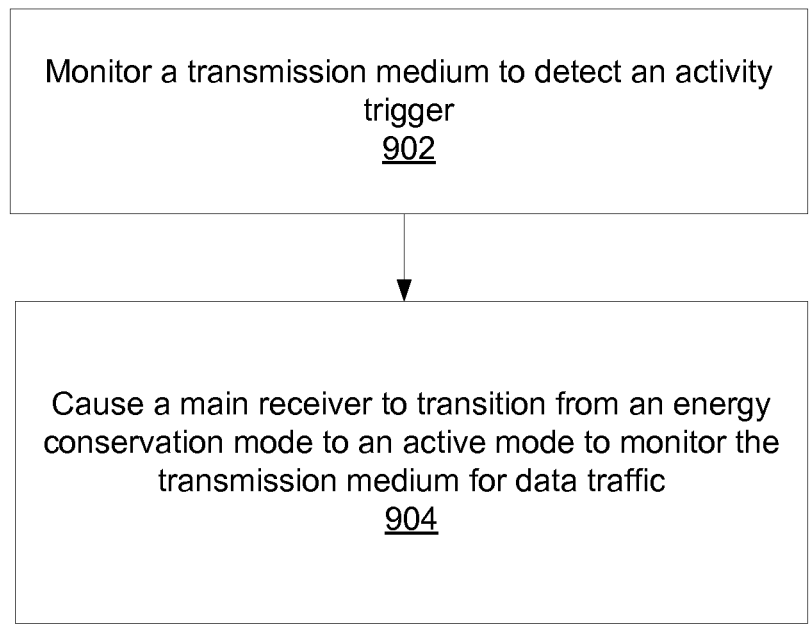
FIG. 9 illustrates an example method.

FIG. 9 illustrates a method according to at least some embodiments. In block 902, the method may include monitoring signals received via a transmission medium by a paging monitor to detect an activity trigger. In 904, the method may include, in response to detecting the activity trigger, causing, by the paging monitor, a main receiver to transition from an energy conservation mode to an active mode to monitor the transmission medium for data traffic.

Embodiments described herein can include a computer readable storage medium (e.g., a CD-ROM, CD-RW, DVD, floppy disc, FLASH memory, RAM, ROM, magnetic platters of a hard drive, etc.) storing computer executable instructions that, when executed by one or more processors, cause an application server, CED, or other device to carry out operations described herein. A computer readable storage medium is a physical and tangible structure that can be touched by a human.

The foregoing description of embodiments has been presented for purposes of illustration and description. The foregoing description is not intended to be exhaustive or to limit embodiments of the present disclosure to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present disclosure in various embodiments and with various modifications as are suited to the particular use contemplated. The features of the embodiments described herein may be combined in all possible combinations of methods, apparatuses, modules, systems, and machine-readable storage media. Any and all permutations of features from above-described embodiments are the within the scope of the disclosure. In the claims, terms such as "first," "second," etc. are used to differentiate among features and do not (in the absence of language to the contrary) have temporal significance.

The invention claimed is:

1. A method comprising:
receiving, by a computing device, a wakeup signal comprising an address identifying the computing device and an instruction to be performed by the computing device, wherein the wakeup signal is orthogonal to data signals received by the computing device when the computing device is awake;
transitioning to an active mode in response to the wakeup signal;
performing the instruction comprised in the wakeup signal; and
returning to a low-power mode of operation upon completion of performing the instruction comprised in the wakeup signal.

2. The method of claim 1,
wherein the wakeup signal is out of band with respect to the data signals; and
wherein the data signals are part of a multicast transmission on a data carousel.

3. The method of claim 1, wherein the data signals comprise firmware updates.

4. The method of claim 2, wherein the wakeup signal and the data signals are combined prior to the receiving by the computing device.

5. The method of claim 1, wherein the address comprised in the wakeup signal identifies a plurality of computing devices including the computing device.

6. The method of claim 1, wherein the instruction comprised in the wakeup signal is one of a pre-determined vocabulary of instructions.

7. The method of claim 6, wherein the data signals comprise updates to the pre-determined vocabulary of instructions.

8. An apparatus comprising:
a transmitter configured to be coupled to a transmission medium and configured to transmit a wakeup signal comprising an address identifying a computing device to be woken and an instruction to be performed by the computing device, wherein the wakeup signal is orthogonal to data signals used to transmit data to the computing device when the computing device is awake.

9. The apparatus of claim 8, wherein the transmitter is further configured to transmit the wakeup signal out of band with respect to the data signals and to transmit the data signals as part of a multicast transmission on a data carousel.

10. The apparatus of claim 8, wherein the data comprises firmware updates.

11. The apparatus of claim 9, wherein the transmitter further comprises a combiner that combines the wakeup signal and the data signals.

12. The apparatus of claim 8, wherein the address comprised in the wakeup signal identifies a plurality of computing devices including the computing device.

13. A system comprising:
a transmitter configured to be coupled to a transmission medium and configured to transmit a wakeup signal comprising an address identifying a computing device to be woken and an instruction to be performed by the computing device, wherein the wakeup signal is orthogonal to data signals used to transmit data to the computing device when the computing device is awake; and
the computing device, wherein the computing device is configured to receive wakeup signals and data transmitted via the transmission medium and to transition from an energy conservation mode to an active mode in response to the wakeup signal comprising the address identifying the computing device, and wherein the computing device is configured to perform the instruction and to return to the energy conservation mode upon completion of performing the instruction.

14. The apparatus of claim 8, wherein the instruction comprised in the wakeup signal is one of a pre-determined vocabulary of instructions.

15. The apparatus of claim 14, wherein the data comprises updates to the pre-determined vocabulary of instructions.

16. The system of claim 13, wherein the transmitter is further configured to transmit the wakeup signal out of band with respect to the data signals, and wherein the data signals used to transmit data are part of a multicast transmission on a data carousel.

17. The system of claim 16, wherein the transmitter further comprises a combiner that combines the wakeup signal and the data signals.

18. The system of claim 13, wherein the address comprised in the wakeup signal identifies a plurality of computing devices including the computing device.

19. The system of claim 13, wherein the instruction comprised in the wakeup signal is one of a pre-determined vocabulary of instructions.

20. The system of claim 19, wherein the transmitter is further configured to transmit updates to the pre-determined vocabulary of instructions as part of the data signals.

* * * * *

UNITED STATES PATENT AND TRADEMARK OFFICE
CERTIFICATE OF CORRECTION

PATENT NO. : 9,442,549 B2  
APPLICATION NO. : 14/136727  
DATED : September 13, 2016  
INVENTOR(S) : Mark Francisco Page 1 of 1

It is certified that error appears in the above-identified patent and that said Letters Patent is hereby corrected as shown below:

On the Title Page

Page 2, Column 2 of Item (56) Other Publications, Line 4:
Please delete "12/763,027," and insert --13/763,027,--

Signed and Sealed this  
Sixth Day of September, 2022

Katherine Kelly Vidal  
*Director of the United States Patent and Trademark Office*